Aug. 27, 1968  L. B. ROBINSON ET AL  3,399,256
HOT PRESSING ZIRCONIA METHOD
Original Filed Sept. 26, 1963
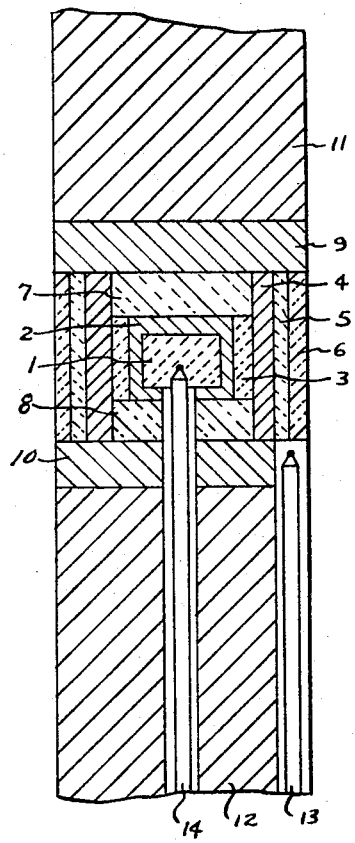
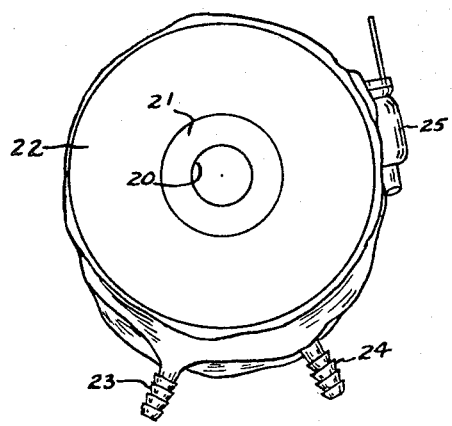
INVENTORS
LAWRENCE B. ROBINSON
FRED W. VAHLDIEK
CHARLES T. LYNCH
BY
Orlando E. McRay
ATTORNEYS

United States Patent Office 3,399,256
Patented Aug. 27, 1968

3,399,256
HOT PRESSING ZIRCONIA METHOD
Lawrence B. Robinson, Flushing, N.Y., and Fred W. Vahldiek, Dayton, and Charles T. Lynch, Fairborn, Ohio, assignors to the United States of America as represented by the Secretary of the Air Force
Continuation-in-part of application Ser. No. 409,031, Nov. 4, 1964. Division of application Ser. No. 311,923, Sept. 26, 1963, now Patent No. 3,218,673, dated Nov. 23, 1965. This application Jan. 20, 1967, Ser. No. 610,729
3 Claims. (Cl. 264—120)

ABSTRACT OF THE DISCLOSURE

Process of forming ceramic bodies by prepressing powder for specimen, placing specimen in Pt tube, placing tube in cell, pressing cell between piston and closure, and subjecting specimen to up to 265,000 p.s.i. at 1800° C., quenching, cooling and removing specimen.

The invention described herein may be manufactured and used by or for the United States Government for governmental purposes without payment to us of any royalty thereon.

Cross-references to related applications

This is a continuation-in-part of application Ser. No. 409,031, filed Nov. 4, 1964, and now abandoned, and is a process division from the apparatus application Ser. No. 311,923, filed Sept. 26, 1963, that issued on Nov. 23, 1965, as Patent No. 3,218,673.

Background of the invention

This invention has as its background and its field the high-pressure, high-temperature shaping or forming of dense zirconium oxide bodies, at up to 30,000 atmospheres and 2,000° C., in process and in product.

Illustrative prior art U.S. patents are numbered 2,941,-248 and 1,071,488.

The process of this invention is the production of ceramic bodies that are close to the theoretical densities and that are of uniform microstructures, as are disclosed at page 479 in the Journal of Chemical and Engineering Data, vol. 7, No. 4, October 1962, that may be regarded as being a part hereof.

Summary of the invention

The summary of the invention broadly is the processing of refractory inorganic materials to high densities in producing a uniform, fine-grained structure, with or without stabilizing oxides. The process also assists in understanding the thermodynamic stability of zirconia in its monoclinic, tetragonal and cubic phases.

Brief description of the drawing

FIG. 1 is an enlarged axial section view of the specimen within the forming cell; and FIG. 2 is a perspective view of the pressure cylinder within which the forming cell in FIG. 1 is positioned during the forming operation.

Description of the preferred embodiment

In the accompanying drawing, the specimen 1 illustratively and as a preferred embodiment is initially zirconium oxide of monoclinic structure, of 99.9% by weight reactor grade, experimentally containing 82 parts per million hafnium and less than 100 parts per million iron as major impurities, and powdered to −325 mesh pressed into cylindrical form and enclosed within a platinum cylinder.

All specimens of pure zirconia are prepared by prepressing the powder in 0.25 and 1.180 inch diameter dies at 2,600 atmospheres or 38,200 p.s.i. This die head range, using $pi\gamma^2$ as an area of a circle, is from 0.04909 to 1.0956 square inches. The specimen is then enclosed in a container, such as the platinum tube 2 in FIG. 1 of the drawing, and is placed in the cell.

The cell comprises, in addition to the platinum tube 2 enclosed specimen 1, in a radially outwardly moving direction, a first boron nitride insulation sleeve 3, a carbon-silicon carbide heater 4, a second boron nitride insulation sleeve 5, and a lava insulation sleeve 6. In the axial direction the specimen 1 in its platinum tube enclosure, is interposed between a pair of lava plugs 7 and 8 axially outwardly from which are a pair of carbon inserts 9 and 10 to complete the structure of the specimen enclosing cell.

The cell is shown in FIG. 1 as being positioned between a piston 11 and a closure 12 that together serve in applying compression forces from the piston to the closure through the cell that is disposed therebetween. The closure 12 is grooved axially along its surface to receive in an unstressed state at all times a Pt–Pt 10% Rh thermocouple 13. The closure 12 also contains an axially extending Ir–Ir 60% Rh thermocouple 14 that has its hot junction within the sample 1. The thermocouple 14 is removable to avoid its being stressed mechanically under some situations.

The cell that is illustrated in enlarged detail in FIG. 1 is adapted for being removably inserted into the orifice 20 that extends centrally and axially of the pressure cylinder 21. The pressure cylinder 21 is constructed of a high-speed tool steel that has been treated to a hardness of Rc 60/61. For pressures in the range of 20,000 to 30,000 atmospheres, the pressure cylinder 21 illustratively may be made of tungsten-carbide.

The temperature of the pressure cylinder 21 is controlled in a suitable manner, as illustratively by means of an outer restraining ring 22 that is made of a desired alloy steel of an illustrative hardness of Rc 40/45, and a water jacket through which water is circulated continuously between the connections 23 and 24. Clamps 25 hold asbestos paper over the outer side of the water jacket.

The closure 12 occupies one end of the orifice 20, the cell is positioned on the closure 12 and the piston 11 delivers a desired hydraulic pressure on the end of the cell that is remote from the closure 12. The piston 11 and the closure 12 are made illustratively of tool steel that is comparable with the tool steel of which the pressure cylinder 21 is made.

Reaching and maintaining the temperatures here of interest requires a system that is insulated both electrically and thermally. Toward this objective a thin pyrophyllite sleeve, not shown, preferably is used to insulate the piston 11 and closure 12 from the cylinder wall that defines the orifice 20 by being positioned therebetween.

The internal resistance heater 4 may be made of one or more materials selected from the group that consists of silicon carbide-carbon and platinum-20% rhodium for developing temperatures up to 1,800° C.; or of selected grades of graphite for developing temperatures up to 2,000° C.

Protective heater insulation that is non-reactive with graphite at the temperatures maintained is required. Pyrophyllite is found to be a good pressure-tranmitting medium and to provide good insulating properties. The temperature of pyrophyllite that is out of contact with the heater 4 at its maximum operating temperature, does not exceed 1,000° C. and at higher pressures its melting point is raised considerably. Boron nitride is resistant to reaction with graphite to about 2,400° C., is machinable to close tolerances, and its use as disclosed herein, is believed to be unique.

The inner thermocouple 14 is used for determining a family of temperature-calibration curve values for each material. During specimen runs at high pressures, the specimen temperature is determined by readings of the thermocouple 13 and the values are applied to the previously prepared calibration curves made from readings from both thermocouples.

In making a run, the sample or specimen is placed in the apparatus, and the force applied to the sample is slowly raised to 50 tons. The force is supplier from a hydraulic press and is applied by the piston 11 to the specimen 1 supported by the closure 12. Fifty tons load or 100,000 lbs. applied over an area of 0.038 square inch is equivalent to 18,000 atmospheres±200 atmospheres=265,000 p.s.i. The pressure of 50 tons on a sample area of 0.038 square inch is held for about 5 minutes and then is slowly released, returning the sample to atmospheric conditions of 1 atmosphere pressure and 22° C.

This procedure is repeated and the sample is heated at the rate of about 100° C. per minutes until it arrives at about 1,200° C. At 1,200° C. the pressure is increased slowly to 18,000 atmospheres, as the temperature is held at 1,200° C. This pressure is maintained as the temperature is again increased by 100° C. increments per minute to 1,800° C. The temperature is held at 1,800° C. and the pressure is held at 18,000 atmospheres for 15 minutes, or for up to an hour if preferred.

The temperature is then dropped slowly to 1,200° C., at which temperature the pressure is slowly released with a rise in temperature. The temperature is further increased to 1,800° C. and is maintained for ten minutes while still under reduced pressure. The pressure is again increased to 18,000 atmospheres and the heating power is shut off, thereby quenching the sample at high pressure. When the die has cooled to room temperature, the pressure is slowly released and the sample is removed.

The resultant sample is hard, dense and is translucent. Zirconia made by this process is close to the theoretical density, it has a uniform microstructure, and has a fine grain size.

The high-pressure zirconia bodies were tested for thermal shock resistance by cycling through the monoclinic-tetragonal phase transformation which occurs between 1,100° C. and 1,250° C. with substantial transformation at 1,190° C. to 1,200° C. Specimens are quenched from 1,350° C. to room temperature of 72° F., or 22° C.

The thermal shock resistance of the samples is far superior to that of pure zirconia made by other processes. X-ray diffraction patterns show that the tetragon phase has been quenched-in under pressure as a metastable phase present in addition to the monoclinic phase at room temperature.

Spectrographic analysis of the zirconia indicates a typical pick-up of about 0.05% impurity, mainly Al and B. Useful range of producing a good body is 1,200 C. to 2,000° C., at pressures of from 10,000 to 30,000 atmospheres. Both pure zirconia and zirconia stabilized with other oxides, such as calcia and yttria are made.

In general, temperatures that are sufficiently high for accomplishing rapid diffusion within the sample also require a few minutes at high pressure. The simultaneous application of high temperature and high pressure, or the application of pressure followed by heating and quenching under pressure and then releasing the pressure, provide good samples.

The method disclosed herein is applicable also to a wide variety of refractory inorganic materials, such as the oxides; hafnia, titania, silica, alumina, magnesia, etc.; the borides: titanium diboride, zirconium diboride, hafnium diboride, tantalum diboride, etc.; and carbides: titanium carbide, hafnium carbide, zirconium carbide, tantalum carbide, silicon carbide, etc.; the nitrides: titanium nitride, hafnium nitride, zirconium nitride, tantalum nitride, aluminum nitride, etc., and the silicides: molybdenum disilicide, tungsten disilicide, zirconium disilicide, hafnium disilicide, etc.

Accurate pressure at high temperatures (above 30° C. and up) are not known at the present time. The pressure is determined by calibration at room temperature using the well-known pressure scale transitions of bismuth wire (Bi I–II, Bi II–III) at 25.4 and 27 kilobars, respectively (Ref. 1) (36,900 and 39,200 p.s.i.). So, the pressure of 18,000 atmospheres reported here is calibrated at room temperature and extrapolated to high temperature. As to the pressing and heating steps of a sequence one can say the following: The "slow" application of pressure starts initially with pressing up to 1,000 atmospheres at a rate of 200 atmospheres per minute, then maintaining that pressure for five (5) minutes, releasing the pressure to about 1 atmosphere. Then reapplying the pressure to 1000 atmospheres, at a rate of 2,000 atmospheres per minute, and heating up to 1200° C. at a rate of about 100° C. per minute. Then the pressure is increased to 18,000 atmospheres at a rate of 2,000 atmospheres per minute while maintaining the temperature at 1200° C. then the temperature is raised to 1800° C. at a rate of 100° C. per minute at a constant pressure of 18,000 atmospheres. The specimen is held at 1800° C. and 18,000 atmospheres for fifteen (15) minutes. Then the temperature is lowered to 1200° C. at a rate of 100° C. per minute, then the pressure is released to one (1) atmosphere at a rate of 2,000 atmospheres per minute. The temperature is then increased to 1800° C. (100° C. per minute) and the specimen is kept at 1800° C. and 1 atmosphere for ten (10) minutes. Then the pressure is increased to 18,000 atmospheres at a rate of 2,000 atmospheres per minute while maintaining 1800° C. temperature. Then the specimen is quenched to room temperature at a rate of 1000° C. per minute at 18,000 atmospheres pressure. Now the pressure is released to one atmosphere (2,000 atmospheres per minute) and the specimen removed from the container.

50 tons (load)=100,000 lbs. applied over an area of 0.038 inch$^2$=18,000 atmospheres=265,000 p.s.i. or lbs./inch$^2$, 1 atmosphere=14.7 p.s.i. or lbs./inch$^2$, 1 kilobar=14,500 p.s.i. or lbs./inch$^2$.

(Ref. 1) G. C. Kennedy and P. N. La Mori, "Some Fixed Points on the High Pressure Scale," pages 304–313 in "Progress in Very High Pressure Research," edited by F. P. Bundy et al., John Wiley & Sons, publ., N.Y., 1961.

It is to be understood that the examples and the process steps that are disclosed herein are submitted as being successfully operative embodiments of the present invention, and that similarly operative substitutions and modifications may be made therein without departing from the spirit and the scope of the present invention.

We claim:

1. The process of forming a hard, dense ceramic body by the steps of prepressing as a specimen ceramic powder at about room temperature in a die at 2600 atmospheres pressure, positioning the prepressed ceramic specimen inside of a platinum tube, positioning the platinum tube enclosed specimen inside of an inner boron nitride sleeve that is disposed axially between a pair of lava plugs, positioning the specimen-containing inner boron nitride sleeve inside of a cylindrical carbon-silicon carbide heater that is shielded by being disposed inside of a second outer boron nitride sleeve within a cylindrical lava sleeve disposed axially between a pair of carbon inserts with the assembly so made comprising the ceramic body forming cell, positioning the cell axially between a force-driven piston and a closure that together serve in applying axially directed compression forces from the piston to the closure through the specimen inside of the cell, slowly applying pressure to the cell at a rate of about 200 atmospheres per minute up to the pressure of 1000 atmospheres, maintaining the pressure at 1000 atmospheres for 5 minutes and then releasing the pressure to about one atmosphere; reapplying the pressure at the rate of about 2000 atmospheres per minutes up to a pressure of 1000 atmospheres and heating up at a rate of about 100° C. per minute to 1200° C. and then increasing the pressure at a rate of 2000 atmospheres per minute to a pressure of 18,000 atmospheres while maintaining the temperature at 1200° C., raising the temperature at a rate of 100° C. per minute to 1800° C. at the constant pressure of 18,000 atmospheres, holding the specimen at 1800° C. and 18,000 atmospheres pressure for 15 minutes, lowering the temperature at a rate of 100° C. per minute to 1200° C., then releasing the pressure at a rate of 2000 atmospheres per minute to one atmosphere, increasing the temperature at 100° C. per minute to 1800° C., holding the specimen at 1800° C. for 10 minutes, increasing the pressure at a rate of 2000 atmospheres per minute to 18,000 atmospheres while maintaining the temperature at 1800° C., reducing the specimen temperature at a rate of 1000° C. per minute at 18,000 atmospheres pressure to 22° C., and then releasing the pressure at the rate of 2000 atmospheres per minute to one atmosphere pressure, and removing from the die the ceramic body made by the process from the specimen.

2. The method defined by claim 1 wherein the powder is zirconia.

3. The method defined by claim 2 wherein the zirconia is replaced by a compound selected from the group that consists of hafnium oxide, titanium oxide, silicon oxide, aluminum oxide, magnesium oxide, zirconium boride, hafnium boride, titanium boride, tantalum boride, zirconium carbide, hafnium carbide, titanium carbide, silicon carbide, and tantalum carbide, zirconium nitride, hafnium nitride, titanium nitride, tantalum nitride, aluminum nitride, zirconium silicide, hafnium silicide, molybdenum silicide, and tungsten silicide.

No references cited.

ROBERT F. WHITE, *Primary Examiner.*

J. H. SILBAUGH, *Assistant Examiner.*